United States Patent
Reddy et al.

(10) Patent No.: US 10,754,748 B2
(45) Date of Patent: Aug. 25, 2020

(54) SYSTEM AND METHOD FOR CONSTRUCTING EXTENSIBLE EVENT LOG WITH JAVASCRIPT OBJECT NOTATION (JSON) ENCODED PAYLOAD DATA

(71) Applicant: American Megatrends International, LLC, Norcross, GA (US)

(72) Inventors: Bakka Ravinder Reddy, Suwanee, GA (US); Divya Nettem, Suwanee, GA (US); Joseprabu Inbaraj, Suwanee, GA (US); Brandon Burrell, Suwanee, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 0 days.

(21) Appl. No.: 15/597,627

(22) Filed: May 17, 2017

(65) Prior Publication Data

US 2018/0336171 A1 Nov. 22, 2018

(51) Int. Cl.
*G06F 11/30* (2006.01)
*G06F 3/048* (2013.01)
*G06F 40/00* (2020.01)

(52) U.S. Cl.
CPC ...... *G06F 11/3068* (2013.01); *G06F 2201/86* (2013.01)

(58) Field of Classification Search
CPC ............ H04L 63/0245; H04L 63/1416; H04L 63/1425; H04L 41/069; G06K 2009/00738; G06F 11/3072; G06F 11/3438; G06F 11/3476; G06F 2201/86; G06F 17/40; G06F 9/542; G06F 11/3068
See application file for complete search history.

(56) References Cited

U.S. PATENT DOCUMENTS

| | | | | |
|---|---|---|---|---|
| 7,174,557 | B2 * | 2/2007 | Sanghvi | G06F 9/542 |
| | | | | 709/217 |
| 7,743,164 | B2 * | 6/2010 | Coldren | H04L 1/0083 |
| | | | | 709/236 |
| 8,898,264 | B1 * | 11/2014 | Walther | G06F 16/9024 |
| | | | | 709/223 |
| 9,390,118 | B2 * | 7/2016 | Surlaker | G06F 16/258 |
| 10,379,915 | B2 * | 8/2019 | Furtwangler | G06F 17/40 |
| 2007/0118491 | A1 * | 5/2007 | Baum | G06K 9/6217 |
| | | | | 706/20 |

(Continued)

*Primary Examiner* — Ariel Mercado
(74) *Attorney, Agent, or Firm* — Locke Lord LLP; Tim Tingkang Xia, Esq.

(57) ABSTRACT

Systems and methods for constructing extensible event log with JavaScript Object Notation (JSON) encoded payload data. The system includes a computing device. The computing device may be connected to a device, where an event has occurred. The device may send a message to the management software of the computing device based on the event, where the message includes information corresponding to an event occurred at the device and payload data of the event. When the management software receives the message, the management software may determine an event type of the event based on the information, and then convert the payload data of the event to encoded payload data in an extensible format, such as the JSON format. Thus, the management software may generate and store an event log comprising the event type and the encoded payload data.

20 Claims, 5 Drawing Sheets

(56) References Cited

U.S. PATENT DOCUMENTS

| | | | |
|---|---|---|---|
| 2014/0047040 A1* | 2/2014 | Patiejunas | G06F 16/00 |
| | | | 709/206 |
| 2014/0082513 A1* | 3/2014 | Mills | H04L 41/069 |
| | | | 715/744 |
| 2016/0026510 A1* | 1/2016 | Furtwangler | G06F 9/542 |
| | | | 719/318 |
| 2017/0054716 A1* | 2/2017 | Egorov | G06F 21/6227 |
| 2017/0250857 A1* | 8/2017 | McCullough | H04L 41/0686 |

* cited by examiner

SYSTEM AND METHOD FOR CONSTRUCTING EXTENSIBLE EVENT LOG WITH JAVASCRIPT OBJECT NOTATION (JSON) ENCODED PAYLOAD DATA

FIELD

The present disclosure relates generally to computer technology, and more particularly to systems and methods for constructing an extensible event log using JavaScript Object Notation (JSON) encoded payload data.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A computer system normally includes a management application for managing certain number of computing devices. During management of those computing devices, varying status may be recorded as different types of event logs, and the event logs may be stored in a database. The different event logs in the data base may have their own type of data type, data size, and each character of the event log may correspond to a column for storing the character. Once a new type of computing device is added in the management system, one or more new columns may be required to store certain new characters of the event log. This made the database grown larger, and different types of event logs may not be easily recognized directly by the administrator due to the data type used for encoding the event logs.

Therefore, an unaddressed need exists in the art to address the aforementioned deficiencies and inadequacies.

SUMMARY

Certain aspects of the present disclosure relate to a system including a computing device. In certain embodiments, the computing device includes a processor and a storage device storing computer executable code. The computer executable code, when executed at the processor of the computing device, is configured to: receive a message from a device, wherein the message comprises information corresponding to an event occurred at the device and payload data of the event; and in response to receiving the message: determine an event type of the event based on the information, convert the payload data of the event to encoded payload data in an extensible format, and generate and store an event log comprising the event type and the encoded payload data.

In certain embodiments, the computer executable code includes: a data store, configured to store an event list and the event log, wherein the event list comprises information of a plurality of types of events; a conversion module, configured to convert the payload data of the event to the encoded payload data in response to receiving the message; and a processing module, configured to: receive the message from the device; and in response to receiving the message, determine the event type of the event based on the information by comparing the information corresponding to the event in the message with the information of the plurality of types of events in the event list; and generate and store the event log in the data store.

In certain embodiments, the computer executable code further includes a user interface (UI) module to provide a UI for a user on the device. In certain embodiments, the processing module further includes a converting submodule, configured to convert the payload data of the event to the encoded payload data.

In certain embodiments, the extensible format is a JavaScript Object Notation (JSON) format, and the conversion module is a JSON conversion engine for converting the payload data to the encoded payload data in the JSON format.

In certain embodiments, the computer executable code further includes a user interface (UI) module, configured to generate a UI, and to display the event log stored in the data store through the UI.

In certain embodiments, the computer executable code further includes a discovery module, configured to: discover a new device; and receive device configuration data from the new device, wherein the device configuration data includes at least one event type of the new device. In certain embodiments, the processing module is further configured to update the event list in the data store based on the device configuration data.

In certain embodiments, the processing module is configured to update the event list in the data store by: comparing each of the at least one event type of the new device with the information of the plurality of types of events in the event list; and when the at least one event type of the new device does not match any of the plurality of types of events in the event list, updating the event list by adding the at least one event type to the plurality of types of events in the event list.

In certain embodiments, the extensible format is an Extensible Markup Language (XML) format.

In certain embodiments, the computing device is controller. In one embodiment, the controller is a baseboard management controller (BMC).

Certain aspects of the present disclosure relate to a method for constructing an extensible event log by a computing device. In certain embodiments, the method includes: receiving, by the management software, a message from a device, wherein the message comprises information corresponding to an event occurred at the device and payload data of the event; and in response to receiving the message: determining, by the management software, an event type of the event based on the information; converting, by the management software, the payload data of the event to encoded payload data that has an extensible format; and generating and storing, by the management software, an event log comprising the event type and the encoded payload data.

In certain embodiments, the management software includes a data store configured to store an event list comprising information of a plurality of types of events, and the event type of the event is determined by comparing the information corresponding to the event in the message with the information of the plurality of types of events in the event list.

In certain embodiments, the method further includes: discovering, by the management software, a new device; receiving, by the management software, device configuration data from the new device, wherein the device configuration data comprises at least one event type of the new device; and updating, by the management software, the event list in the data store based on the device configuration data.

In certain embodiments, the event list in the data store is updated by: comparing each of the at least one event type of the new device with the information of the plurality of types of events in the event list; and when the at least one event type of the new device does not match any of the plurality of types of events in the event list, updating the event list by adding the at least one event type to the plurality of types of events in the event list.

In certain embodiments, the extensible format is JSON format or XML format.

Certain aspects of the present disclosure relate to a non-transitory computer readable medium storing computer executable code. In certain embodiments, the computer executable code, when executed at a processor of a computing device, is configured to: receive a message from a device, wherein the message comprises information corresponding to an event occurred at the device and payload data of the event; and in response to receiving the message, determine an event type of the event based on the information; convert the payload data of the event to encoded payload data in an extensible format; and generate and store an event log comprising the event type and the encoded payload data.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor.

In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refers to a hardware electronic component, and may refer to or include a small electronic circuit unit, also known as an integrated circuit (IC), or a combination of electronic circuits or ICs.

The term "IPMI," as used herein, refers to the Intelligent Platform Management Interface, which is a set of computer interface specifications for an autonomous computer subsystem that provides management and monitoring capabilities independently of the host system's CPU, firmware (BIOS or UEFI) and operating system.

The term "event log" is a file or entry of a database that records either events that occur in an operating system or other software runs, or messages between different users of a communication software. Logging is the act of keeping a log. In the simplest case, messages are written to a single log file. A transaction log is a file (i.e., log) of the communications (i.e., transactions) between a system and the users of that system, or a data collection method that automatically captures the type, content, or time of transactions made by a person from a terminal with that system. The events stored in the event log may include public events, repository events, issue events for a repository, public events for a network of repositories, public events for an organization, events that a user has received, public events that a user has received, events performed by a user, public events performed by a user, and events for an organization.

Many operating systems, software frameworks, and programs include a logging system. A widely used logging standard is syslog, defined in Internet Engineering Task Force (IETF) RFC 5424. The syslog standard enables a dedicated, standardized subsystem to generate, filter, record, and analyze log messages. This relieves software developers of having to design and code their own ad hoc logging systems.

An event log entry may include a payload. The term "payload" is the part of the transmitted data that is the actual intended message. Payload does not include information sent with it such as headers or metadata, sometimes referred to as overhead data, sent solely to facilitate payload delivery.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

Figure 1:
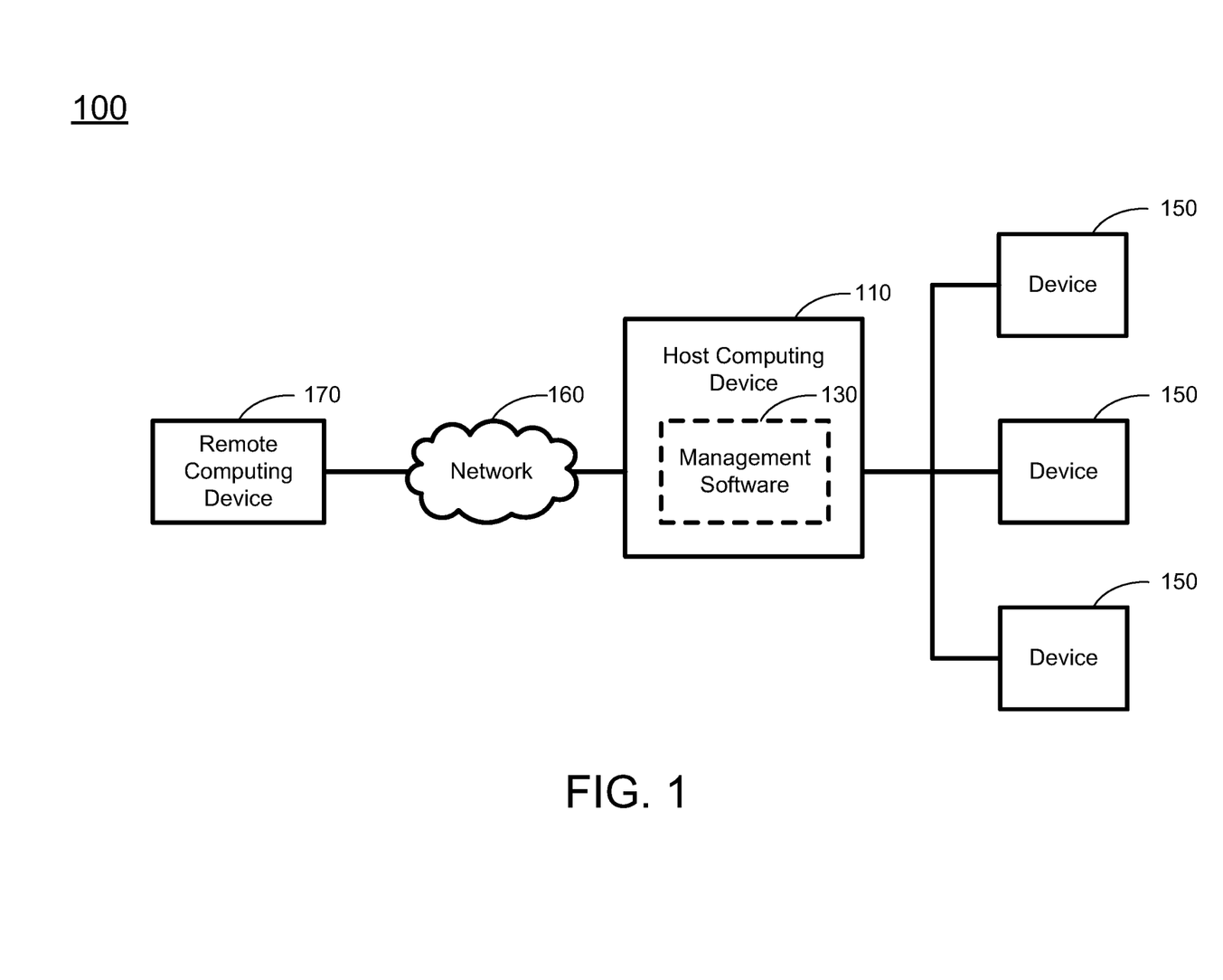
FIG. 1 schematically depicts a system according to certain embodiments of the present disclosure.

In accordance with the purposes of present disclosure, as embodied and broadly described herein, in certain aspects, the present disclosure relates to a system for constructing extensible event log with JavaScript object notation (JSON) encoded payload data. FIG. 1 schematically depicts a system according to certain embodiments of the present disclosure. As shown in FIG. 1, the system 100 includes a host computing device 110, a management software 130 installed on the host computing device 110, and a plurality of devices 150 managed by the management software 130. In certain embodiments, each of the devices 150 may be connected to the computing device 110 via an interface. Optionally, the system 100 may include a remote computing device 170, which is connected to the computing device 110 via a network 160. In certain embodiments, the remote computing devices 170 are clients, including think client. In certain embodiments, the host computing device 130 may be a server. The management software 130 may manages the devices 150, and the client 170 access the devices 150 via the management software 130 located on the server 110. In certain embodiments, the network 160 may be a wired or wireless network, and may be of various forms. Examples of the network 160 may include, but is not limited to, a local area network (LAN), a wide area network (WAN) including the Internet, or any other type of networks. The best-known computer network is the Internet.

The host computing device 110 is a host computer of the management software 130. In certain embodiments, the host computing device 110 may be a general purpose computer, a specialized computer, a server, or any other types of computing device. In certain embodiments, one or more of the devices 150 may be a part of the host computing device 110. In certain embodiments, the host computing device 110 may include necessary hardware components and software components (not shown) to perform its corresponding tasks. Examples of these hardware and software components may include, but not limited to, other required memory, interfaces, buses, input/output (I/O) modules and peripheral devices. In certain embodiments, the host computing device 110 comprises a controller, and the management software 130 may be a firmware of the controller.

Figure 2:
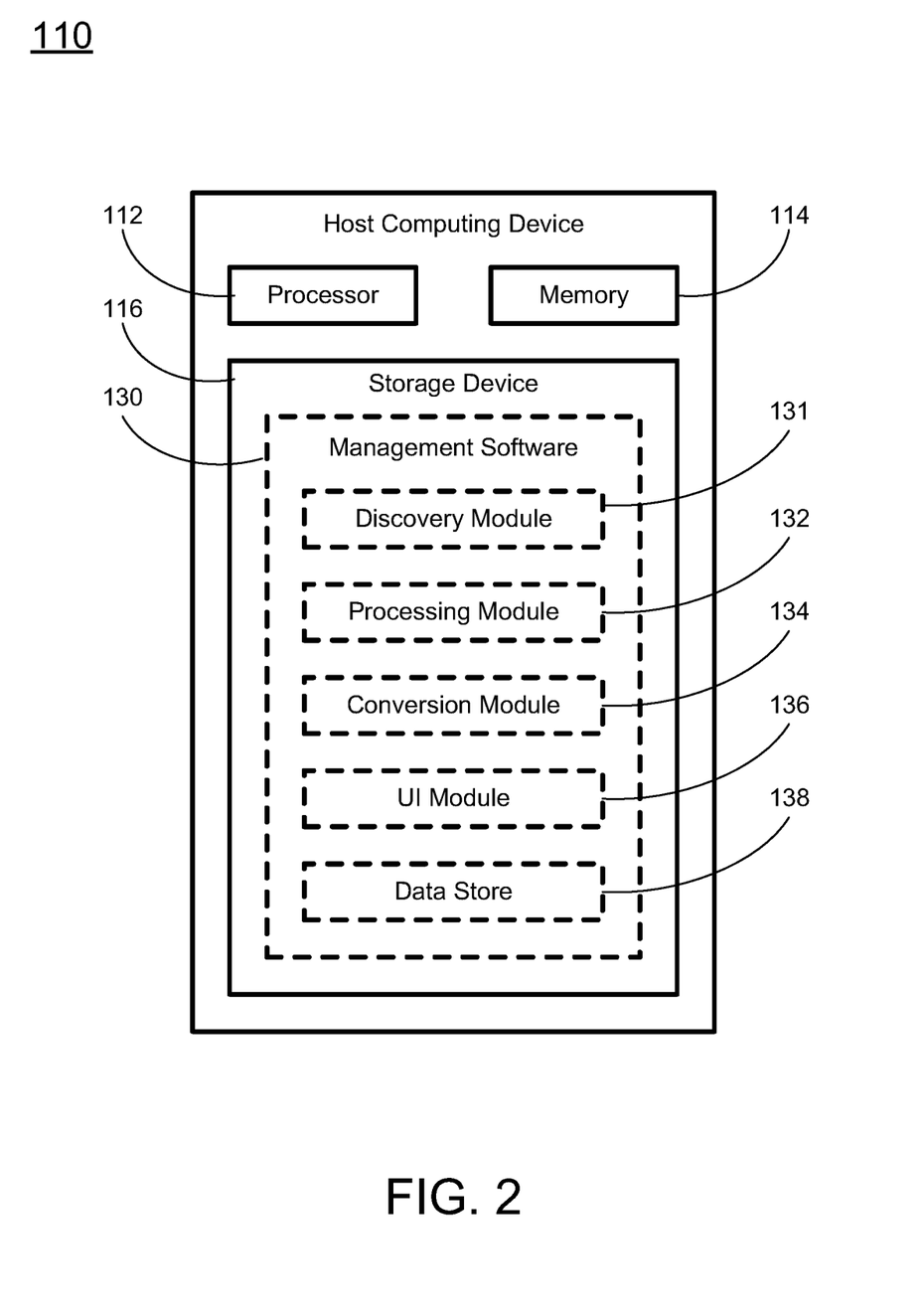
FIG. 2 schematically depicts a host computing device according to certain embodiments of the present disclosure.

FIG. 2 schematically depicts a computing device according to certain embodiments of the present disclosure. As shown in FIG. 2, the computing device 110 includes a processor 112, a memory 114, and a storage device 116. In certain embodiments, the computing device 110 may include other hardware components and software components (not shown) to perform its corresponding tasks. Examples of these hardware and software components may include, but not limited to, other required memory, interfaces, buses, input/output (I/O) modules or devices, network interfaces, and peripheral devices.

The processor 112 controls operation of the computing device 110. In certain embodiments, the processor 112 may be a central processing unit (CPU). The processor 112 may execute any computer executable code or instructions, such as a management software 130 or other codes stored in the computing device 110. In certain embodiments, the computing device 110 may run on or more than one processor, such as two processors, four processors, eight processors, or any suitable number of processors.

The memory 114 may be a volatile memory, such as the random-access memory (RAM), for storing the data and information during the operation of the computing device 110. In certain embodiments, the memory 114 may be a volatile memory array. In certain embodiments, the computing device 110 may run on more than one memory 114.

The storage device 116 is a data storage media or device for storing the computer executable code of the computing device 110. Examples of the storage device 116 may include hard drives, floppy disks, optical drives, non-volatile memory such as flash memory, memory cards, universal serial bus (USB) drives, or any other types of data storage devices. In certain embodiments, the computing device 110 may have more than one storage devices 116, and the management software 130 and other applications of the computing device 110 may be stored in the more than one storage device 116 separately.

As shown in FIG. 2, the storage device 116 stores the management software 130 of the computing device 110. The management software 130 of the computing device 110 includes computer executable codes for performing the operation of the computing device 110. In certain embodiments, the computer executable code or instructions may collectively form the management software 130. As shown in FIG. 2, the management software 130 includes, among other things, a discovery module 131, a processing module 132, a conversion module 134, a user interface (UI) module 136, and a data store module 138. In certain embodiments, each of the modules of the management software 130 may further include one or more sub-modules. Alternatively, in certain embodiments, some or all of the modules of the management software 120 may collectively form a single module.

The discovery module 131 is used to discover a new device being connected to the host computing device 110. In certain embodiments, the discovery module 131 may be scheduled to perform discovery operations periodically to discovery new devices according to a predetermined schedule. Alternatively, the discovery module 131 may perform a discovery operation according an instruction received from the host computing device 110 or the remote computing device 170. Specifically, in a discovery operation, the discovery module 131 is configured to send one or more request messages out for the new device available in the system 100. If a new device 150 is in the system 100, the new device 150 may then send a feedback message to the discovery module 131, such that a communication channel may be established between the new device 150 and the discovery module 131. The feedback message may include identification information and device configuration data of the new device 150, such that the discovery module 131 may recognize the new device 150 using the identification information, and configure the events that may occur at the new device 150 based on the device configuration data. In certain embodiments, the device configuration data may include information of one or more event types of the events that may occur at the new device 150. Once receiving the feedback message, the discovery module 131 may add the new device 150 into the device list of the management software 130 based on the identification information, and forward the device configuration data to the processing module 132 for further processing. In certain embodiments, the discovery operation may utilize the standard discovery mechanisms under, or may utilize existing vendor-specific discovery mechanisms provided by the vendors of the host computing device 110.

The processing module 132 is used to record events occurred at the devices 150. Specifically, the processing module 132 is configured to receive information related to an event occurred at a device 150, and compare the information received to information of a plurality of types of events in an event list, which is stored in the data store 138.

In certain embodiments, for example, when the management software 130 executed at the processor 112, receives a message from a device 150 that indicates an event occurred at the device, the message may include information corresponding to the event that has occurred at the device 150, and payload data of the event. Upon receiving the message, the processing module 132 processes the information corresponding to the event in the message, and determines an event type of the event based on the information. In particular, the processing module 132 may compare the information corresponding to the event in the message with the information of the plurality of types of events in the event list, which is stored in the data store 138. When the information matches with one of the types of events in the event list, the processing module 132 may determine an event type of the event accordingly. In certain embodiments, the event type of the event indicates the nature of the event. For example, an event may be a licensing event, a task event, or any other event that may be defined with its corresponding event type. Once the event type is determined, the processing module 132 knows the format of the payload data included in the message. Thus, the processing module 132 may then call the conversion module 134 to convert the payload data to encoded payload data. Once the encoded payload data is obtained, the processing module 132 may generate an event log with the data type and encoded payload data, and store the event log in the data store 138.

In certain embodiments, for example, when the processing module 132 receives the device configuration data of a new device 150 from the discovery module 131, the processing module 132 may update the event list in the data store 138 based on the device configuration data of the new device 150. Specifically, the processing module 132 may retrieve the information of one or more event types of the new device 150 from the device configuration data received, and then compare the information of the one or more event types of the new device 150 with the information of the plurality of types of events in the event list, which is stored in the data store 138. In certain embodiments, one or more of the event types of the new device 150 may be existing types of event in the event list, and the comparison process will result in a match of the information. In this case, there is no need to update the event list. On the other hand, one or more of the event types of the new device 150 may not be existing types of event in the event list, and the comparison process of the information with such event type (or event types) of the new device will result in no match with any of the types of events in the event list. When the one or more event types of the new device 150 do not match any of the types of events in the event list, the processing module 132 may update the event list by adding the event type (or event types) of the new device 150 to the types of events in the event list. Thus, the event list in the data store 138 should maintain all of the event types that may occur at all of the devices 150 being connected to the host computing device 110.

The conversion module 134 is a module for payload data conversion. In certain embodiments, the conversion module 134 is configured to convert the payload data, according to its data properties, to an encoded payload data that is in an extensible data format. The extensible data may be JavaScript Object Notation (JSON) format data or Extensible Markup Language (XML) format data. For example, the conversion module 134 may be a JSON conversion engine for converting the payload data to the encoded payload data in the JSON format. JSON is an open-standard language-independent format that uses human-readable text to transmit data objects including attribute-value pairs. In other words, each of the JSON objects may include a text message that is readable by human. In this case, the encoded payload data in the JSON format may include text strings, so that a user can view the encoded payload data in the event log directly via a UI to obtain information of the event. There are different types of payload data from different events, and the different events may come from different devices 150. If each type of the payload data is defined with a specific character and reserved with a fixed cell value in a database, the database would be very big, and the adding of new type of payload would be difficult. In certain embodiments, since the encoded payload data have the same extensible format, e.g., the JSON format or other extensible formats, the encoded payload data may be easily stored in a database.

The UI module 136 is a module which, when executed at the processor 112, provides a UI, such that a user of the host computing device 110 may control the host computing device 110 and access the event log stored in the data store 138 through the UI. Specifically, the UI is configured to provide various functionalities, including retrieving the event log from the data store 138, parsing the encoded payload data in the event log, and display the event log. In certain embodiments, the UI may be a web UI, which is implemented and designed as a web page, such that a user may access the web UI from the host computing device 110 or the remote computing device 170 to obtain and display the event log.

The data store 138 is configured to store information of the host computing device 110. In certain embodiments, the information stored in the data store 138 may include, without being limited thereto, the event list and one or more event logs for the devices 150. The event list is a list of all of the types of events that may occur at the devices 150, and each event type may have its corresponding characterization, such that the processing module 132 may use the stored information of the types of events to perform a comparison process in order to determine the event type of a message received from a device 150. In certain embodiments, when the processing module 132 performs the comparison process and determines that the information of the event type of a new device does not match any of the event types in the data list, the processing module 132 may update the event list in the data store 138.

Each of the devices 150 is a component communicatively connected to the management software 130 such that the management software 130 may monitor the events occurred at the devices 150. In certain embodiments, each of the devices 150 may be a hardware component, such as a hardware including power supply, memory, processor, graphic card, storage devices such as hard disk and CD-drive, or peripheral devices such as keyboard, mouse, monitor, etc. In certain embodiments, each of the devices 150 may be a virtual component simulated by software, as if the virtual device is an existing physical device. In certain embodiments, each of the devices 150 may be a local device located at the host computing device 110, and is connected to the management software 130 via an interface. For example, some of the local devices 150 may be connected to the management software 130 via the system interface, and some of the local devices 150 may have a separate interface for connection to the management software 130. In certain embodiments, some of the devices 150 may be a remote device, which is not located at the host computing device 110, and requires network connection to communicate with the management software 130. In certain embodiments, the system 100 may include multiple devices 150 to be monitored by the management software 130. Some of the devices 150 may be respectively connected to the management software 130 of the host computing device 110 via a separate dedicated interface, and some of the devices 150 may share one or more interfaces or network to communicate with the management software 130 of the host computing device 110.

The remote computing device 170 is a computer communicatively connected to the host computing device 110 via the network 160. In certain embodiments, the remote computing device 170 may be a general purpose computer, a specialized computer, a server, or any other types of computing device. In certain embodiments, one or more of the devices 150 may be a part of the remote computing device 170.

Figure 3:
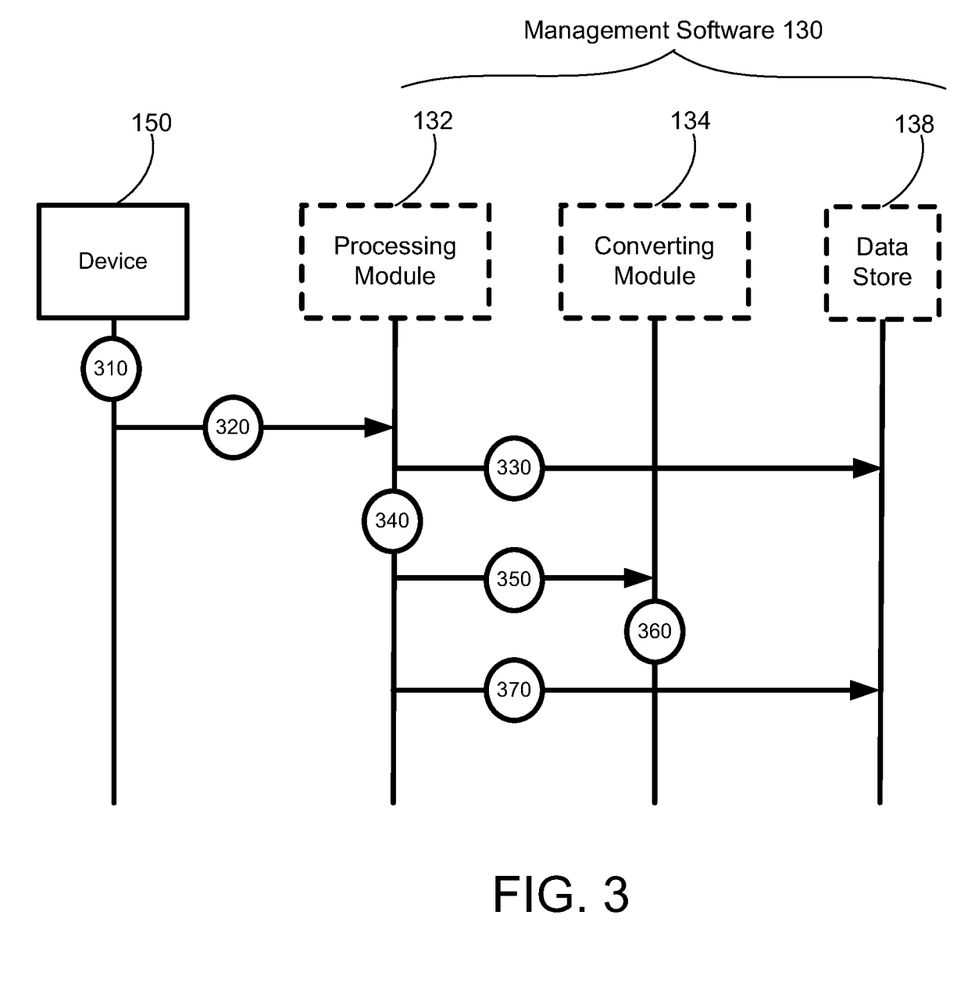
FIG. 3 depicts a process for generating an event log for an event occurred at a device according to certain embodiments of the present disclosure.

FIG. 3 depicts a process for generating an event log for an event occurred at a device according to certain embodiments of the present disclosure. In certain embodiments, the process as shown in FIG. 3 may be implemented on a system as shown in FIGS. 1 and 2. It should be particularly noted that, unless otherwise stated in the present disclosure, the steps of the method may be arranged in a different sequential order, and are thus not limited to the sequential order as shown in FIG. 3.

As shown in FIG. 3, at procedure 310, an event occurs at a device 150, and the device 150 generates a corresponding message for the event. At procedure 320, the device 150 sends the message to the management software 130 of the host computing device 110. In certain embodiments, the message includes information corresponding to the event, and payload data of the event. In certain embodiments, the message may be sent actively by the device 150. In certain embodiments, the message may be sent to the management software 130 in response to a request from the host computing device 110.

Upon receiving the message from the device 150, at procedure 330, the processing module 132 accesses the data store 138 to retrieve the event list from the data store 138. At procedure 340, the process module 132 determines the event type of the event by comparing the information corresponding to the event in the message with the information of the types of events in the event list retrieved from the data store 138. Since the event list should maintain all of the event types that may occur at the devices 150, the comparison process should result in a match. Once the processing module 132 finds a match of the information, the event type corresponding to the event is determined. In certain embodiments, if the information corresponding to the event does not match any event in the event list, the event type corresponding to the event may be added to the event list.

Once the event type of the event information is determined, at procedure 350, the processing module 132 calls the conversion module 134 to convert the payload data in the message based on the determined event type. At procedure 360, the conversion module 134 converts the payload data in the message to the encoded payload data in the extensible format. For example, the converted payload data may be in the JSON format. After conversion, at procedure 370, the processing module 132 may generate an event log based on the event type and the corresponding encoded payload data, and store the event log in the data store 138. In certain embodiments, the payload data may be in a variety of formats according to the type or property of the event, the event source, etc., and the different type of payload data are converted to encoded payload data that having the same format, such as JSON format. In certain embodiments, the encoded payload data may not be in the JSON format, instead, the encoded payload data may be in another type of extensible format, such as the XML format.

Figure 4:
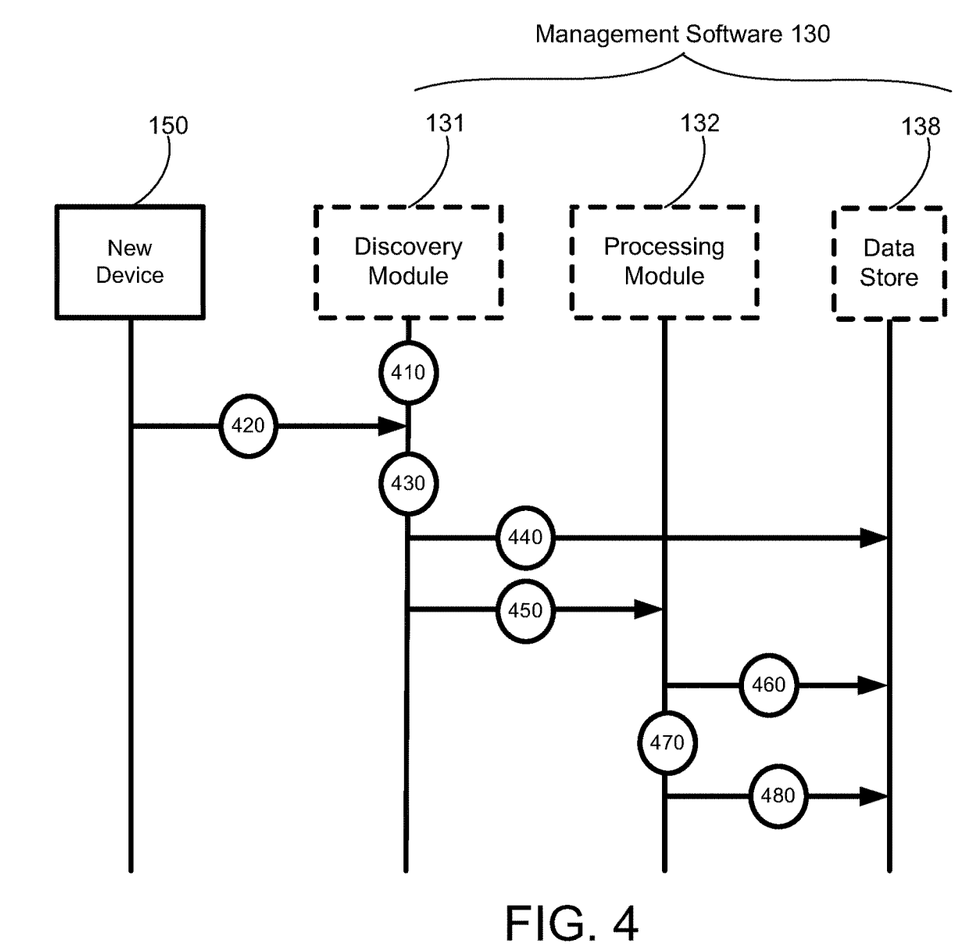
FIG. 4 schematically depicts a discovery process for a new device according to certain embodiments of the present disclosure.

FIG. 4 schematically depicts a discovery process for a new device according to certain embodiments of the present disclosure. In certain embodiments, the process as shown in FIG. 4 may be implemented on a system as shown in FIGS. 1 and 2. It should be particularly noted that, unless otherwise stated in the present disclosure, the steps of the method may be arranged in a different sequential order, and are thus not limited to the sequential order as shown in FIG. 4.

As shown in FIG. 4, at procedure 410, the discovery module 131 performs a discovery operation, in which the discovery module 131 may send one or more request messages out for the new device available in the system 100. At procedure 420, a new device 150 sends a feedback message to the discovery module 131. In certain embodiments, the feedback message may include identification information and device configuration data of the new device 150. In certain embodiments, the device configuration data may include information of one or more event types of the events that may occur at the new device 150. At procedure 430, the discovery module 131 may process the identification information of the new device 150 to recognize the new device 150. At procedure 440, the discovery module 131 may store the identification information of the new device 150 into the data store 138, such that the new device 150 will now be recognized by the management software 130 as one of the devices 150 communicatively connected to the management software 130.

At procedure 450, the discovery module 131 calls the processing module 132 to process the device configuration data of the new device 150. Upon receiving the device configuration data of the new device 150, at procedure 460, the processing module 132 accesses the data store 138 to retrieve the event list from the data store 138. In certain embodiments, the device configuration data may include information of one or more event types of the events that may occur at the new device 150. At procedure 470, the process module 132 compares the information of one or more event types of the events in the device configuration data of the new device 150 with the information of the types of events in the event list retrieved from the data store 138. Since the events that may occur at the new device 150 may include one or more events not in the event list, the comparison process may result in a no-match for some of the events. Once the processing module 132 finds a no-match of the information, at procedure 480, the processing module 132 may update the event list stored in the data store 138 by adding the event type information the event list.

Figure 5:
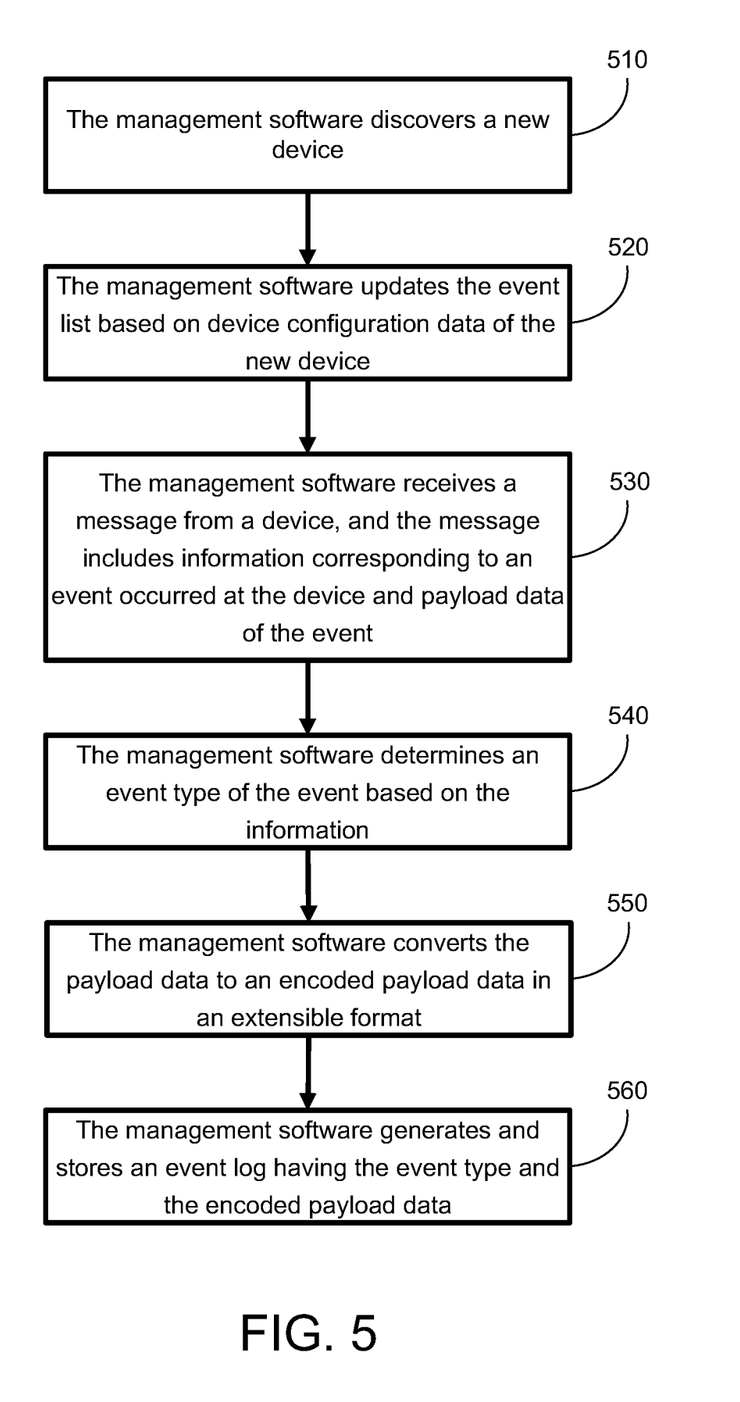
FIG. 5 schematically depicts a flowchart of a method for constructing an event log for an event according to certain embodiments of the present disclosure.

A further aspect of the present disclosure is directed to a method for construct an extensible event log of a host computing device. FIG. 5 schematically depicts a flowchart showing a method of construct an event information in an extensible data format according to certain embodiments of the present disclosure. In certain embodiments, the method as shown in FIG. 5 may be implemented on a system as shown in FIGS. 1 and 2. It should be particularly noted that, unless otherwise stated in the present disclosure, the steps of the method may be arranged in a different sequential order, and are thus not limited to the sequential order as shown in FIG. 5.

As shown in FIG. 5, at procedure 510, the management software 130 of the host computing device 110 discovers a new device. In certain embodiments, the discovery module 131 of the management software 130 may perform a discovery operation, and the new device sends a feedback message to the discovery module 131. The feedback message may include device configuration data of the new device. At procedure 520, the management software 130 may update the event list based on the device configuration data of the new device. Details of the discovery operation and the updating process of the event list at procedures 510 and 520 have been described above with reference to FIG. 4, and are thus not elaborated herein.

At procedure 530, the management software 130 receives a message from the device 150. In certain embodiments, the message includes information corresponding to an event occurred at the device and payload data of the event. At procedure 540, in response to receiving the message, the management software 130 determines an event type of the event based on the information. In certain embodiments, the event type is determined by comparing the information with the event type information in the event list, which is stored in the data store 138 of the management software 130. Once the event type is determined, at procedure 550, the management software 130 converts the payload data included in the message into encoded payload data in an extensible format, such as the JSON format, the XML format, or other types of extensible data format. At procedure 560, the management software 130 may generate an event log by combining the event type and the encoded payload data, and store the event log in the data store 138. Details of the generation of the event log at procedures 530-560 have been described above with reference to FIG. 3, and are thus not elaborated herein.

As described above, the above procedures may be performed in any order, for example, sequentially, or in parallel, or independent from each other. For example, the discovery operation and updating process of the data list may be periodically performed by the management software 130, and during the discovery operation and updating process of the data list, the management software 130 may simultaneously generate event logs for all of the existing devices 150.

In certain embodiments, once the event log is stored in the data store 138 of the management software 130, a user (e.g., an administrator of the system 100) may access the management software 130 from the host computing device 130 or the remote computing device 170, and use the UI generated by the UI module 136 to display the event log. The user may thus read the contents of the event log to obtain information of the event.

In certain embodiments, the implementation of the system and method as described above requires communication between the management software 130 and the devices 150. It should be particularly noted that the management software 130 may be in simultaneous communication with multiple devices 150, and may simultaneously generate multiple event logs for multiple devices 150.

With the system and method as described in the embodiments above, the management software 130 may easily generate and store event logs with the encoded payload, regardless of the sources of the events (i.e., the devices 150) and the payload data type of the events. Since the payload data is encoded in an extensible format without breaking the cell of the database that holds the payload data, the event log having the encoded payload data may be easily converted to any other formats that is suitable for displaying or other purposes, thus make the communication between different devices conveniently.

In another aspect, the present disclosure relates to a non-transitory computer readable medium storing computer executable code. In certain embodiments, the computer executable code may be the firmware stored in the storage device 116 as described above. The computer executable code, when being executed, may perform one of the methods described above. In certain embodiments, the non-transitory computer readable medium may include, but not limited to, the storage device 116 of the management software 130 as described above, or any other storage media of the management software 130.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a computing device, comprising a processor and a storage device storing computer executable code; and
a device managed by the computing device,
wherein the computer executable code, when executed at the processor, is configured to:
receive a message from the device managed by the computing device, wherein the message comprises information corresponding to an event occurred at the device and payload data of the event, the payload data of the event included in the message is in a specific format, and the specific format of the payload data of the event is identifiable solely by an event type of the message; and
in response to receiving the message,
determine the event type of the event based on the information;
recognize the specific format of the payload data of the event solely based on the event type of the event;
convert the payload data of the event in the specific format to encoded payload data in an extensible format; and
generate and store an event log comprising the event type and the encoded payload data.

2. The system of claim 1, wherein the computer executable code comprises:
a data store, configured to store an event list and the event log, wherein the event list comprises information of a plurality of types of events;
a conversion module, configured to convert the payload data of the event to the encoded payload data in response to receiving the message; and
a processing module, configured to:
receive the message from the device; and
in response to receiving the message,
determine the event type of the event based on the information by comparing the information corresponding to the event in the message with the information of the plurality of types of events in the event list; and
generate and store the event log in the data store.

3. The system of claim 2, wherein the extensible format is a JavaScript Object Notation (JSON) format, and the conversion module is a JSON conversion engine for converting the payload data in the specific format to the encoded payload data in the JSON format.

4. The system of claim 2, wherein the computer executable code further comprises a user interface (UI) module, configured to generate a UI, and to display the event log stored in the data store through the UI.

5. The system of claim 2, wherein the computer executable code further comprises a discovery module, configured to:
discover a new device; and
receive device configuration data from the new device, wherein the device configuration data comprises at least one event type of the new device;
wherein the processing module is further configured to update the event list in the data store based on the device configuration data.

6. The system of claim 5, wherein the processing module is configured to update the event list in the data store by:
comparing each of the at least one event type of the new device with the information of the plurality of types of events in the event list; and
when the at least one event type of the new device does not match any of the plurality of types of events in the event list, updating the event list by adding the at least one event type to the plurality of types of events in the event list.

7. The system of claim 1, wherein the extensible format is an Extensible Markup Language (XML) format.

8. The system of claim 1, wherein the computing device is a controller.

9. A method for constructing an extensible event log by a management software of a computing device, comprising:
receiving, by the management software, a message from a device managed by the management software of the computing device, wherein the message comprises information corresponding to an event occurred at the device and payload data of the event, the payload data of the event included in the message is in a specific format, and the specific format of the payload data of the event is identifiable solely by an event type of the message; and
in response to receiving the message,
determining, by the management software, the event type of the event based on the information;
recognizing, by the management software, the specific format of the payload data of the event solely based on the event type of the event;

converting, by the management software, the payload data of the event in the specific format to encoded payload data that has an extensible format; and generating and storing, by the management software, an event log comprising the event type and the encoded payload data.

10. The method of claim 9, wherein the management software comprises a data store configured to store an event list comprising information of a plurality of types of events, and the event type of the event is determined by comparing the information corresponding to the event in the message with the information of the plurality of types of events in the event list.

11. The method of claim 10, further comprising:
discovering, by the management software, a new device;
receiving, by the management software, device configuration data from the new device, wherein the device configuration data comprises at least one event type of the new device; and
updating, by the management software, the event list in the data store based on the device configuration data.

12. The method of claim 11, wherein the event list in the data store is updated by:
comparing each of the at least one event type of the new device with the information of the plurality of types of events in the event list; and
when the at least one event type of the new device does not match any of the plurality of types of events in the event list, updating the event list by adding the at least one event type to the plurality of types of events in the event list.

13. The method of claim 9, wherein the extensible format is a JavaScript Object Notation (JSON) format or an Extensible Markup Language (XML) format.

14. A non-transitory computer readable medium storing computer executable code, wherein the computer executable code, when executed at a processor of a computing device, is configured to:
receive a message from a device managed by the computing device, wherein the message comprises information corresponding to an event occurred at the device and payload data of the event, the payload data of the event included in the message is in a specific format, and the specific format of the payload data of the event is identifiable solely by an event type of the message; and
in response to receiving the message,
determine the event type of the event based on the information;
recognize the specific format of the payload data of the event solely based on the event type of the event;
convert the payload data of the event in the specific format to encoded payload data in an extensible format; and
generate and store an event log comprising the event type and the encoded payload data.

15. The non-transitory computer readable medium of claim 14, wherein the computer executable code comprises:
a data store, configured to store an event list and the event log, wherein the event list comprises information of a plurality of types of events;
a conversion module, configured to convert the payload data of the event to the encoded payload data in response to receiving the message; and
a processing module, configured to:
receive the message from the device; and
in response to receiving the message,
determine the event type of the event based on the information by comparing the information corresponding to the event in the message with the information of the plurality of types of events in the event list; and
generate and store the event log in the data store.

16. The non-transitory computer readable medium of claim 15, wherein the extensible format is a JavaScript Object Notation (JSON) format, and the conversion module is a JSON conversion engine for converting the payload data in the specific format to the encoded payload data in the JSON format.

17. The non-transitory computer readable medium of claim 15, wherein the computer executable code further comprises a user interface (UI) module, configured to generate a UI, and to display the event log stored in the data store through the UI.

18. The non-transitory computer readable medium of claim 15, wherein the computer executable code further comprises a discovery module, configured to:
discover a new device; and
receive device configuration data from the new device, wherein the device configuration data comprises at least one event type of the new device;
wherein the processing module is further configured to update the event list in the data store based on the device configuration data.

19. The non-transitory computer readable medium of claim 18, wherein the processing module is configured to update the event list in the data store by:
comparing each of the at least one event type of the new device with the information of the plurality of types of events in the event list; and
when the at least one event type of the new device does not match any of the plurality of types of events in the event list, updating the event list by adding the at least one event type to the plurality of types of events in the event list.

20. The non-transitory computer readable medium of claim 14, wherein the extensible format is an Extensible Markup Language (XML) format.

* * * * *